United States Patent
Wang et al.

(10) Patent No.: US 11,277,799 B2
(45) Date of Patent: Mar. 15, 2022

(54) COMMUNICATION METHOD, NETWORK DEVICE, AND TERMINAL

(71) Applicant: Huawei Technologies Co., Ltd., Shenzhen (CN)

(72) Inventors: Yafei Wang, Shanghai (CN); Yubo Yang, Shanghai (CN); Peng Zhang, Shanghai (CN); Hao Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 180 days.

(21) Appl. No.: 16/586,292

(22) Filed: Sep. 27, 2019

(65) Prior Publication Data

US 2020/0053659 A1     Feb. 13, 2020

Related U.S. Application Data

(63) Continuation of application No. PCT/CN2018/091394, filed on Jun. 15, 2018.

(30) Foreign Application Priority Data

Jun. 16, 2017  (CN) .......................... 201710458085.1

(51) Int. Cl.
*H04W 52/14*    (2009.01)
*H04W 52/36*    (2009.01)
(Continued)

(52) U.S. Cl.
CPC ....... *H04W 52/146* (2013.01); *H04W 52/365* (2013.01); *H04W 72/0406* (2013.01); *H04W 72/1268* (2013.01); *H04W 72/044* (2013.01)

(58) Field of Classification Search
None
See application file for complete search history.

(56) References Cited

U.S. PATENT DOCUMENTS

| 2011/0105173 A1* | 5/2011 | Haim ................. H04W 52/365 455/522 |
| 2012/0083308 A1* | 4/2012 | Wang ................. H04W 52/367 455/522 |

(Continued)

FOREIGN PATENT DOCUMENTS

| CN | 102685869 A | 9/2012 |
| CN | 103582099 A | 2/2014 |

(Continued)

OTHER PUBLICATIONS

"Report of Email Discussion on [96#28][NR] MAC to Support Multiple Numerologies," Agenda Item: 3.2.1.2, Source: Nokia, Alcatel-Lucent Shanghai Bell, WID/SID: FS_NR_newRAT—Release 14, Document for: Discussion and Decision, R2-1700250, 3GPP TSG-RAN WG2 NR Adhoc, Jan. 17-19, 2017, 20 pages.

(Continued)

*Primary Examiner* — Jamaal Henson
(74) *Attorney, Agent, or Firm* — Slater Matsil, LLP

(57) ABSTRACT

A method includes: receiving, by a network device, first information, second information, and third information from a terminal using a first component carrier, where the first information includes a power headroom of the first component carrier, the second information indicates whether transmit power of the terminal is equal to maximum available transmit power of the terminal, the third information indicates a difference between the maximum available transmit power and transmit power of a second component carrier, and a subcarrier spacing of the first component carrier is greater than a subcarrier spacing of the second component carrier; and scheduling, by the network device, uplink transmission of the terminal based on the first information, the second information, and the third information, where (Continued)

uplink transmit power of the first component carrier does not exceed the difference.

14 Claims, 4 Drawing Sheets

(51) Int. Cl.
  *H04W 72/04* (2009.01)
  *H04W 72/12* (2009.01)

(56) References Cited

U.S. PATENT DOCUMENTS

| | | |
|---|---|---|
| 2014/0348078 A1 | 11/2014 | Kim et al. |
| 2015/0133179 A1 | 5/2015 | Li et al. |
| 2015/0156733 A1 | 6/2015 | Han et al. |
| 2015/0208358 A1 | 7/2015 | Ahn et al. |
| 2015/0215944 A1* | 7/2015 | Kim .................. H04L 5/001 370/329 |
| 2016/0255594 A1 | 9/2016 | Vajapeyam et al. |
| 2017/0034793 A1* | 2/2017 | Uchino .............. H04W 72/0413 |
| 2017/0055223 A1 | 2/2017 | Shao et al. |
| 2018/0242264 A1* | 8/2018 | Pelletier .............. H04W 52/346 |
| 2020/0045643 A1 | 2/2020 | Wang et al. |

FOREIGN PATENT DOCUMENTS

| | | | |
|---|---|---|---|
| CN | 105101374 A | 11/2015 | |
| CN | 105407524 A | 3/2016 | |
| CN | 106304299 A | 1/2017 | |
| EP | 2521279 A1 * | 11/2012 | .......... H04W 52/247 |
| EP | 3361791 A1 | 8/2018 | |

OTHER PUBLICATIONS

"PHR for NR CA," Agenda Item: 10.3.1.10, Source: Lenovo, Motorola Mobility, Document for: Discussion and Decision, 3GPP TSG-RAN WG2 Meeting #98, R2-1705406, May 15-19, 2017, 2 pages.

\* cited by examiner

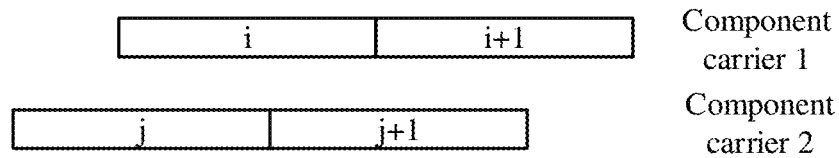

FIG. 6

A terminal determines an overlapped part between a first slot and a second slot, where the first slot is a slot in which the terminal uses a first component carrier, the second slot is a slot in which the terminal uses a second component carrier, the first component carrier carries a first channel, a first signal, or a first service, the second component carrier carries a second channel, a second signal, or a second service, and a priority of the second channel, the second signal, or the second service is higher than a priority of the first channel, the first signal, or the first service ~ S710

The terminal adjusts uplink power of the first component carrier in the overlapped part between the first slot and the second slot ~ S720

FIG. 7

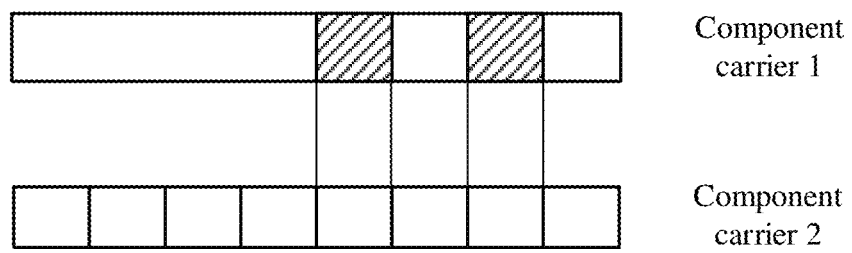

FIG. 8

COMMUNICATION METHOD, NETWORK DEVICE, AND TERMINAL

CROSS-REFERENCE TO RELATED APPLICATIONS

This application is a continuation of International Application No. PCT/CN2018/91394, filed on Jun. 15, 2018, which claims priority to Chinese Patent Application No. 201710458085.1, filed on Jun. 16, 2017. The disclosures of the aforementioned applications are hereby incorporated by reference in their entireties.

TECHNICAL FIELD

This application relates to the communications field, and more specifically, to a communication method, a network device, and a terminal.

BACKGROUND

Power may be shared in a dual-connectivity between a long term evolution (LTE) communications system below 6 GHz and a new radio (NG) communications system. However, a specific sharing mechanism needs to be further studied.

When the dual-connectivity (DC) is established between the LTE and the NR at a frequency below 6 GHz, to ensure a power requirement of each cell group (CG), a power sharing problem needs to be resolved.

SUMMARY

This application provides a communication method, a network device, and a terminal, to resolve a problem of power sharing between component carriers in a communications system.

According to a first aspect, this application provides a communication method. The communication method includes receiving, by a network device, first information, second information, and third information that are sent by a terminal by using a first component carrier, where the first component carrier is one of a plurality of component carriers configured by the network device for the terminal, the first information includes a power headroom of the first component carrier, the second information indicates whether transmit power of the terminal is equal to maximum available transmit power of the terminal, the third information indicates a difference between the maximum available transmit power and transmit power of a second component carrier, and a subcarrier spacing of the first component carrier is greater than a subcarrier spacing of the second component carrier. The method also includes scheduling, by the network device, uplink transmission of the terminal based on the first information, the second information, and the third information, where uplink transmit power of the first component carrier does not exceed the difference.

In the communication method, in addition to scheduling the uplink transmission of the terminal based on the power headroom of the first component carrier, the network device may further schedule the uplink transmission of the terminal based on maximum available power of the terminal and an adjustable headroom of the first component carrier, so that power sharing between the first component carrier and the second carrier can be implemented.

In addition, the terminal sends the first information, the second information, and the third information by using the first component carrier with a relatively large subcarrier spacing, so that the network device can learn of the first information, the second information, and the third information in time, and can schedule the uplink transmission of the terminal in time.

With reference to the first aspect, in a first possible implementation, the subcarrier spacing of the first component carrier is greater than a subcarrier spacing of any other component carrier in the plurality of component carriers.

The subcarrier spacing of the first component carrier is the largest, so that the network device can obtain the first information, the second information, and the third information in time, to schedule the uplink transmission of the terminal more timely.

With reference to the first aspect or the first possible implementation, in a second possible implementation, the scheduling, by the network device, uplink transmission of the terminal based on the first information, the second information, and the third information includes: when determining, based on the first information, that the power headroom of the first component carrier is greater than 0, and determining, based on the second information, that the transmit power of the terminal is equal to the maximum available transmit power of the terminal, reducing, by the network device based on the third information, a frequency domain resource that is allocated to the terminal in a first slot on the first component carrier, where the first slot is after a second slot, and the second slot is a slot in which the terminal sends the first information by using the first component carrier; or when determining, based on the first information, that the power headroom of the first component carrier is greater than 0, and determining, based on the second information, that the transmit power of the terminal is not equal to the maximum available transmit power of the terminal, increasing, by the network device based on the third information, a frequency domain resource that is allocated to the terminal in a first slot on the first component carrier, where the first slot is after a second slot, and the second slot is a slot in which the terminal sends the first information by using the first component carrier; or when determining, based on the first information, that the power headroom of the first component carrier is less than 0, and determining, based on the second information, that the transmit power of the terminal is not equal to the maximum available transmit power of the terminal, reducing, by the network device based on the third information, a frequency domain resource that is allocated to the terminal in a first slot on the first component carrier, where the first slot is after a second slot, and the second slot is a slot in which the terminal sends the first information by using the first component carrier; or when determining, based on the first information, that the power headroom of the first component carrier is less than 0, and determining, based on the second information, that the transmit power of the terminal is equal to the maximum available transmit power of the terminal, reducing, by the network device based on the third information, a frequency domain resource that is allocated to the terminal in a first slot on the first component carrier, where the first slot is after a second slot, and the second slot is a slot in which the terminal sends the first information by using the first component carrier.

According to a second aspect, this application provides a communication method. The communication method includes classifying, by a network device based on subcarrier spacings of a plurality of component carriers configured by the network device for a terminal, a component carrier with a subcarrier spacing of a first subcarrier spacing in the plurality of component carriers as a first carrier group. The method also includes performing, by the network device, uplink scheduling on the first carrier group.

In the communication method, the network device classifies all component carriers of a subcarrier spacing in the component carriers configured for the terminal as one carrier group, and then may perform uplink scheduling on the carrier group, to implement power sharing of the carrier group.

With reference to the second aspect, in a first possible implementation, the communication method further includes: classifying, by the network device based on the subcarrier spacings of the plurality of component carriers, a component carrier with a subcarrier spacing of a second subcarrier spacing in the plurality of component carriers as a second carrier group; or classifying, by the network device based on the subcarrier spacings of the plurality of component carriers, a component carrier that does not belong to the first carrier group and that is in the plurality of component carriers as a second carrier group.

With reference to the first possible implementation, in a second possible implementation, the performing, by the network device, uplink scheduling on the first carrier group includes: sending, by the network device, first information to the terminal, where the first information instructs the terminal to adjust uplink power of the first carrier group based on uplink power of the second carrier group in a first slot, the first slot overlaps a second slot, an uplink timing of the first slot is after an uplink timing of the second slot, and the second slot is a slot in which the terminal performs uplink transmission by using the first carrier group.

With reference to the second aspect or any one of the foregoing possible implementations, in a third possible implementation, the communication method further includes: configuring, by the network device, guaranteed power for the first carrier group, where the performing, by the network device, uplink scheduling on the first carrier group includes: performing, by the network device, the uplink scheduling on the first carrier group based on the guaranteed power.

With reference to the second aspect or any one of the foregoing possible implementations, in a fourth possible implementation, the communication method further includes: sending, by the network device, second information to the terminal, where the second information is used to configure the first carrier group.

The second information may further be used to configure the second carrier group.

According to a third aspect, this application provides a communication method. The communication method includes determining, by a terminal, an overlapped part between a first slot and a second slot, where the first slot is a slot in which the terminal uses a first component carrier, the second slot is a slot in which the terminal uses a second component carrier, the first component carrier carries a first channel, a first signal, or a first service, the second component carrier carries a second channel, a second signal, or a second service, and a priority of the second channel, the second signal, or the second service is higher than a priority of the first channel, the first signal, or the first service. The method also includes adjusting, by the terminal, uplink power of the first component carrier in the overlapped part.

In the communication method, when determining that the slot of the first component carrier overlaps the slot of the second component carrier, the terminal may perform power control on the overlapped part, thereby helping implement power sharing between the first component carrier and the second component carrier.

With reference to the third aspect, in a first possible implementation, the adjusting, by the terminal, uplink power of the first component carrier in the overlapped part includes: sending, by the terminal in a part other than the overlapped part in the first slot, uplink data by using the first component carrier.

In other words, the terminal does not send the uplink data in the overlapped part of the first slot.

With reference to the third aspect, in a second possible implementation, the adjusting, by the terminal, uplink power of the first component carrier in the overlapped part includes: reducing, by the terminal, transmit power of a resource that is on the first component carrier and that carries service data in the overlapped part; or sending a signal only in a resource that is on the first component carrier and that carries a reference signal and/or control information.

In other words, the terminal sends only the control information and/or reference information, and the like other than data information in the overlapped part of the first slot.

According to a fourth aspect, this application provides a communication method. The communication method includes sending, by a terminal, first information, second information, and third information to a network device by using a first component carrier, where the first component carrier is one of a plurality of component carriers configured by the network device for the terminal, the first information includes a power headroom of the first component carrier, the second information indicates whether transmit power of the terminal is equal to maximum available transmit power of the terminal, the third information indicates a difference between the maximum available transmit power and transmit power of a second component carrier, and a subcarrier spacing of the first component carrier is greater than a subcarrier spacing of the second component carrier. The method also includes performing, by the terminal, uplink transmission under scheduling performed by the network device based on the first information, the second information, and the third information, where uplink transmit power of the first component carrier does not exceed the difference.

In the communication method, the terminal sends the first information, the second information, and the third information to the network device, so that the network device can schedule the terminal based on the information, to further implement power sharing between component carriers.

With reference to the fourth aspect, in a first possible implementation, the subcarrier spacing of the first component carrier is greater than a subcarrier spacing of any other component carrier in the plurality of component carriers.

Optionally, the terminal may send the first information, the second information, and the third information to the network device when a slot corresponding to the first component carrier overlaps a slot corresponding to the second component carrier.

According to a fifth aspect, this application provides a communication method. The communication method includes receiving, by a terminal, first information sent by a network device, where the first information instructs the terminal to adjust uplink power of a first carrier group based on uplink power of a second carrier group in a first slot, the first slot overlaps a second slot, an uplink timing of the first slot is after an uplink timing of the second slot, the second slot is a slot in which the terminal performs uplink transmission by using the first carrier group, the first carrier group includes a component carrier with a subcarrier spacing of a first subcarrier spacing in a plurality of component carriers configured by the network device for the terminal, and the second carrier group includes a component carrier with a subcarrier spacing of a second subcarrier spacing in the plurality of component carriers or includes all component carriers that do not belong to the first carrier group and that are in the plurality of component carriers. The method also includes adjusting, by the terminal under the instruction of the first information, the uplink power of the first carrier group based on the uplink power of the second carrier group in the first slot and a channel priority, a signal priority, or a service priority carried in the first carrier group.

In the communication method, the terminal adjusts uplink power of the first carrier group in a current slot based on instruction of the network device and with reference to uplink power of the second carrier group in a subsequent slot and the channel priority, the signal priority, or the service priority, to implement power sharing.

With reference to the fifth aspect, in a first possible implementation, the communication method further includes: receiving, by the terminal, second information sent by the network device, where the second information is used to configure the first carrier group and the second carrier group.

According to a sixth aspect, this application provides a network device. The network device includes: a transceiver, configured to receive first information, second information, and third information that are sent by a terminal by using a first component carrier, where the first component carrier is one of a plurality of component carriers configured by the network device for the terminal, the first information includes a power headroom of the first component carrier, the second information indicates whether transmit power of the terminal is equal to maximum available transmit power of the terminal, the third information indicates a difference between the maximum available transmit power and transmit power of the second component carrier, and a subcarrier spacing of the first component carrier is greater than a subcarrier spacing of the second component carrier. The network device also includes a processor, configured to schedule uplink transmission of the terminal based on the first information, the second information, and the third information, where uplink transmit power of the first component carrier does not exceed the difference.

The network device helps implement power sharing between component carriers.

With reference to the sixth aspect, in a first possible implementation, the subcarrier spacing of the first component carrier is greater than a subcarrier spacing of any other component carrier in the plurality of component carriers.

With reference to the sixth aspect or the first possible implementation, in a second possible implementation, the processor is specifically configured to: when determining, based on the first information, that the power headroom of the first component carrier is greater than 0, and determining, based on the second information, that the transmit power of the terminal is equal to the maximum available transmit power of the terminal, reduce, based on the third information, a frequency domain resource that is allocated to the terminal in a first slot on the first component carrier, where the first slot is after a second slot, and the second slot is a slot in which the terminal sends the first information by using the first component carrier; or when determining, based on the first information, that the power headroom of the first component carrier is greater than 0, and determining, based on the second information, that the transmit power of the terminal is not equal to the maximum available transmit power of the terminal, increase, based on the third information, a frequency domain resource that is allocated to the terminal in a first slot on the first component carrier, where the first slot is after a second slot, and the second slot is a slot in which the terminal sends the first information by using the first component carrier; or when determining, based on the first information, that the power headroom of the first component carrier is less than 0, and determining, based on the second information, that the transmit power of the terminal is not equal to the maximum available transmit power of the terminal, reduce, based on the third information, a frequency domain resource that is allocated to the terminal in a first slot on the first component carrier, where the first slot is after a second slot, and the second slot is a slot in which the terminal sends the first information by using the first component carrier; or when determining, based on the first information, that the power headroom of the first component carrier is less than 0, and determining, based on the second information, that the transmit power of the terminal is equal to the maximum available transmit power of the terminal, reduce, based on the third information, a frequency domain resource that is allocated to the terminal in a first slot on the first component carrier, where the first slot is after a second slot, and the second slot is a slot in which the terminal sends the first information by using the first component carrier.

According to a seventh aspect, this application provides a network device. The network device includes: a processor, configured to classify, based on subcarrier spacings of a plurality of component carriers configured between the network device and a terminal, a component carrier with a subcarrier spacing of a first subcarrier spacing in the plurality of component carriers as a first carrier group, where the processor is further configured to perform uplink scheduling on the first carrier group.

With reference to the seventh aspect, in a first possible implementation, the processor is further configured to: classify, based on the subcarrier spacings of the plurality of component carriers, a component carrier with a subcarrier spacing of a second subcarrier spacing in the plurality of component carriers as a second carrier group; or classify, based on the subcarrier spacings of the plurality of component carriers, a component carrier that does not belong to the first carrier group and that is in the plurality of component carriers as a second carrier group.

With reference to the first possible implementation, in a second possible implementation, the network device further includes a transceiver, and the transceiver is configured to: send first information to the terminal, where the first information instructs the terminal to adjust uplink power of the first carrier group based on uplink power of the second carrier group in a first slot, the first slot overlaps a second slot, an uplink timing of the first slot is after an uplink timing of the second slot, and the second slot is a slot in which the terminal performs uplink transmission by using the first carrier group.

With reference to the seventh aspect or any one of the foregoing possible implementations, in a third possible implementation, the processor is further configured to configure guaranteed power for the first carrier group, where the processor is specifically configured to perform the uplink scheduling on the first carrier group based on the guaranteed power.

With reference to the seventh aspect or the first possible implementation, in a fourth possible implementation, the network device further includes a transceiver, the transceiver is configured to send second information to the terminal, and the second information is used to configure the first carrier group.

According to an eighth aspect, this application provides a terminal. The terminal includes: a processor, configured to determine an overlapped part between a first slot and a second slot, where the first slot is a slot in which the terminal uses a first component carrier, the second slot is a slot in which the terminal uses a second component carrier, the first component carrier carries a first channel, a first signal, or a first service, the second component carrier carries a second channel, a second signal, or a second service, and a priority of the second channel, the second signal, or the second service is higher than a priority of the first channel, the first signal, or the first service, where the processor is further configured to adjust uplink power of the first component carrier in the overlapped part.

The terminal determines the overlapped part between the first slot of the first component carrier and the second slot of the second component carrier, and then controls the uplink power of the first component carrier in the overlapped part, to implement power sharing between component carriers.

With reference to the eighth aspect, in a first possible implementation, the processor is specifically configured to send, in a part other than the overlapped part in the first slot, uplink data by using the first component carrier.

With reference to the eighth aspect, in a second possible implementation, the processor is specifically configured to: reduce transmit power of a resource that is on the first component carrier and that carries service data in the overlapped part; or send a signal only in a resource that is on the first component carrier and that carries a reference signal and/or control information.

According to a ninth aspect, this application provides a terminal. The terminal includes: a transceiver, configured to send first information, second information, and third information to a network device by using a first component carrier, where the first component carrier is one of a plurality of component carriers configured by the network device for the terminal, the first information includes a power headroom of the first component carrier, the second information indicates whether transmit power of the terminal is equal to maximum available transmit power of the terminal, the third information indicates a difference between the maximum available transmit power and transmit power of a second component carrier, and a subcarrier spacing of the first component carrier is greater than a subcarrier spacing of the second component carrier. The terminal also includes a processor, configured to perform uplink transmission under scheduling performed by the network device based on the first information, the second information, and the third information, where uplink transmit power of the first component carrier does not exceed the difference.

The terminal sends the first information, the second information, and the third information to the network device, so that the network device can schedule the terminal based on the information, to further implement power sharing between component carriers.

With reference to the ninth aspect, in a possible implementation, the subcarrier spacing of the first component carrier is greater than a subcarrier spacing of any other component carrier in the plurality of component carriers.

According to a tenth aspect, this application provides a terminal. The terminal includes: a transceiver, configured to receive first information sent by a network device, where the first information instructs the terminal to adjust uplink power of a first carrier group based on uplink power of a second carrier group in a first slot, the first slot overlaps a second slot, an uplink timing of the first slot is after an uplink timing of the second slot, the second slot is a slot in which the terminal performs uplink transmission by using the first carrier group, the first carrier group includes a component carrier with a subcarrier spacing of a first subcarrier spacing in a plurality of component carriers configured by the network device for the terminal, and the second carrier group includes a component carrier with a subcarrier spacing of a second subcarrier spacing in the plurality of component carriers or includes all component carriers that do not belong to the first carrier group and that are in the plurality of component carriers. The terminal also includes a processor, configured to adjust, under the instruction of the first information, the uplink power of the first carrier group based on the uplink power of the second carrier group in the first slot and a channel priority, a signal priority, or a service priority of the component carrier in the first carrier group.

The terminal adjusts uplink power of the first carrier group in a current slot based on instruction of the network device and with reference to uplink power of the second carrier group in a subsequent slot and the channel priority, the signal priority, or the service priority, to implement power sharing.

With reference to the tenth aspect, in a first possible implementation, the transceiver is further configured to receive second information sent by the network device, where the second information is used to configure the first carrier group and the second carrier group.

In a possible design, the network device provided in this application may include a corresponding module configured to perform a behavior of the network device in the foregoing communication method design. The module may be software and/or hardware.

In a possible design, the terminal provided in this application may include a corresponding module configured to perform a behavior of the terminal in the foregoing communication method design. The module may be software and/or hardware.

In a possible design, a solution implemented by the foregoing terminal may be implemented by a chip.

In a possible design, a solution implemented by the foregoing network device may be implemented by a chip.

According to another aspect of this application, a computer readable storage medium is provided. The computer readable storage medium stores an instruction. When the instruction is run on a computer, the computer performs the method according to any one of the foregoing aspects or any possible implementation of any aspect.

According to still another aspect of this application, a computer program product including an instruction is provided, and when the instruction is run on a computer, the computer is enabled to perform the method according to any one of the foregoing aspects or any possible implementation of any aspect.

BRIEF DESCRIPTION OF THE DRAWINGS

FIG. 6 is a schematic diagram of a component carrier according to another embodiment of this application;

FIG. 7 is a schematic flowchart of a communication method according to another embodiment of this application;

FIG. 8 is a schematic diagram of a component carrier according to another embodiment of this application;

DETAILED DESCRIPTION OF ILLUSTRATIVE EMBODIMENTS

In the following, embodiments of this application are described in detail with reference to the accompanying drawings. Network architectures and service scenarios described in the embodiments of this application are to describe the technical solutions in the embodiments of this application more clearly, but are not intended to limit the technical solutions provided in the embodiments of this application. A person of ordinary skill in the art may understand that, with evolution of the network architecture and appearance of a new service scenario, the technical solutions provided in the embodiments of this application may also be applicable to a similar technical problem.

Figure 1:
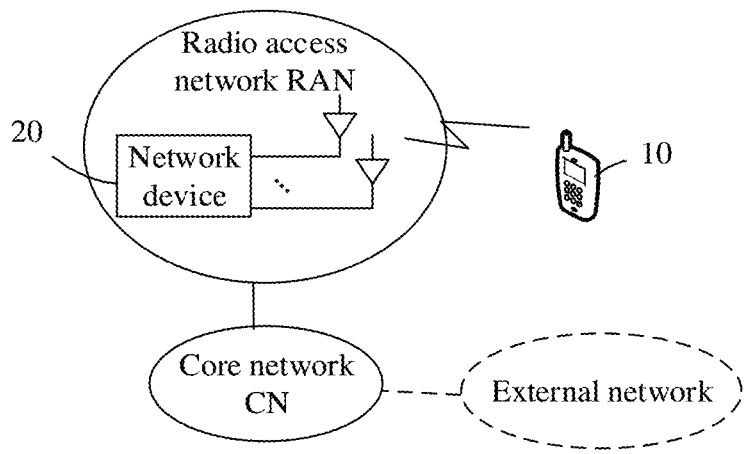
FIG. 1 is a schematic structural diagram of a possible system according to an embodiment of this application.

FIG. 1 is a schematic diagram of a possible system network according to this application. As shown in FIG. 1, at least one terminal 10 communicates with a radio access network (RAN). The RAN includes at least one network device 20. For clarity, only one network device and one user equipment UE are shown in the figure. The RAN is connected to a core network (CN). Optionally, the CN may be coupled to one or more external networks, such as the Internet or a public switched telephone network (PSTN).

For ease of understanding, the following describes terms in this application.

In this application, nouns "network" and "system" are usually interchangeably used, but meaning of that may be understood by a person skilled in the art. User equipment (user equipment, UE) is a terminal device that has a communication function, may also be referred to as a terminal, and may include a handheld device, an in-vehicle device, a wearable device, or a computing device that has a wireless communication function, or another processing device connected to a wireless modem. The user equipment may have different names in different networks, such as a terminal, a mobile station, a subscriber unit, a station, a cellular phone, a personal digital assistant, a wireless modem, a wireless communications device, a handheld device, a laptop computer, a cordless phone, and a wireless local loop board. For ease of description, the user equipment is briefly referred to as user equipment UE or a terminal in this application. The network device may be a device that has a wireless transceiver function, such as a base station (BS), a wireless access device in a cloud network, or a relay station. The base station may also be referred to as a base station device, and is a device that is deployed in the radio access network and that is configured to provide a wireless communication function. Names of base stations in different radio access systems may be different. For example, in a universal mobile telecommunications system (UMTS) network, the base station is referred to as a NodeB, in an LTE network, the base station is referred to as an evolved NodeB (eNB, or eNodeB), and in a future 5G system, the base station may be referred to as a transmission reception point (TRP), a network node, or a g-NodeB (gNB).

When subcarrier spacings of at least two of a plurality of component carriers configured by a network device 20 for a terminal 10 are different, a problem that needs to be resolved is how the terminal 10 performs uplink transmission by using the plurality of component carriers, and more specifically, how the terminal 10 performs uplink transmission by using the plurality of component carriers, so that power of each component carrier can ensure that transmission of a channel, a signal, or a service carried on each component carrier meets a requirement.

To resolve this problem, this application provides a new communication method, a network device, and a terminal.

Figure 2:
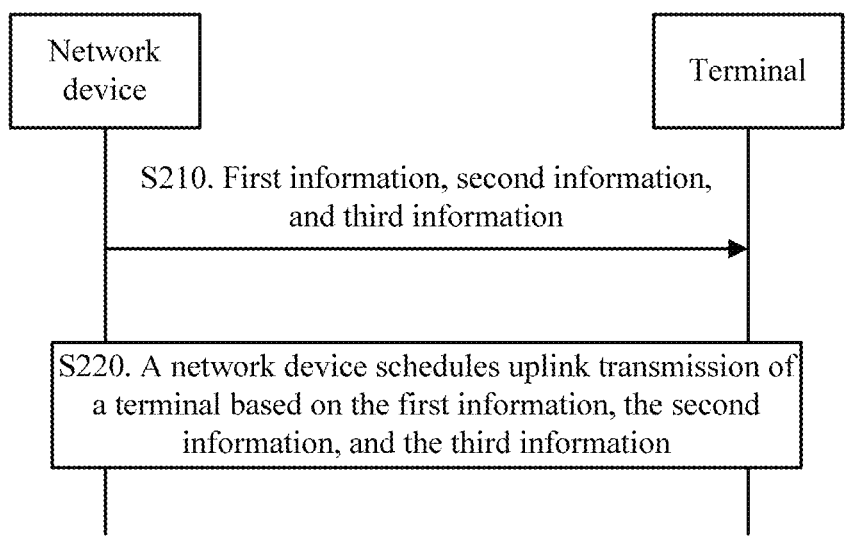
FIG. 2 is a schematic flowchart of a communication method according to an embodiment of this application.

FIG. 2 is a schematic flowchart of a communication method according to an embodiment of this application. It should be understood that FIG. 2 shows steps or operations of the communication method, but these steps or operations are merely examples. In this embodiment of this application, another operation or a variant of each operation in FIG. 2 may be performed.

S210. A terminal sends first information, second information, and third information by using a first component carrier, where the first component carrier is one of a plurality of component carriers configured by the network device for the terminal, the first information includes a power headroom of the first component carrier, the second information indicates whether transmit power of the terminal is equal to maximum available transmit power of the terminal, the third information indicates a difference between the maximum available transmit power of the terminal and transmit power of the second component carrier, and a subcarrier spacing of the first component carrier is greater than a subcarrier spacing of the second component carrier.

Correspondingly, the network device receives the first information, the second information, and the third information that are sent by the terminal by using the first component carrier.

In this embodiment of this application, the network device may configure a plurality of component carriers for the terminal.

For example, when the network device communicates with the terminal in a carrier aggregation mode of an NR system, the network device may configure, for the terminal, a plurality of component carriers each with a subcarrier spacing of $15*2^n$ kHz in the NR system, and subcarrier spacings of at least two of the plurality of component carriers are different. In this case, an example of a subcarrier spacing of the first component carrier is 120 kHz, and an example of a subcarrier spacing of the second component carrier is 15 kHz.

For example, when the network device communicates with the terminal in a dual-connectivity mode between an LTE system and the NR system, the network device may configure, for the terminal, a component with a subcarrier spacing of 15 kHz in the LTE system, and configure, for the terminal, a component carrier with a subcarrier spacing of $15*2^n$ kHz in the NR system, where n is a positive integer. In the mode, an example of the subcarrier spacing of the first component carrier is 120 kHz, and an example of the subcarrier spacing of the second component carrier is 15 kHz.

For another example, when the network device communicates with the terminal in a dual-connectivity mode within the NR system, the network device may configure, for the terminal, a plurality of component carriers each with a subcarrier spacing of 15*2$^n$ kHz in the NR system, and subcarrier spacings of at least two of the plurality of component carriers are different. In this case, an example of the subcarrier spacing of the first component carrier is 120 kHz, and an example of the subcarrier spacing of the second component carrier is 15 kHz.

After the network device configures the plurality of component carriers for the terminal, the terminal may send, by using the first component carrier with a relatively large subcarrier spacing in the plurality of component carriers, the first information, the second information, and the third information to the network device in a slot corresponding to the first component carrier. Correspondingly, the network device receives, in the slot corresponding to the first component carrier, the first information, the second information, and the third information that are sent by the terminal by using the first component carrier.

The first information includes the power headroom of the first component carrier. It may be understood that the first information includes a power headroom of the first component carrier in a current slot. The first information may be specifically information about a power headroom report (PHR) of the first component carrier.

The second information indicates whether the transmit power of the terminal is equal to the maximum available transmit power of the terminal. It may be understood that the second information indicates whether current transmit power of the terminal exceeds the maximum available transmit power of the terminal, or may be understood that the second information indicates whether the maximum available transmit power is currently used by the terminal.

The second information may specifically include one bit. In other words, one bit is used to indicate whether the transmit power of the terminal is equal to the maximum available transmit power of the terminal. For example, when the second information is "1", it may indicate that the transmit power of the terminal is equal to the maximum available transmit power of the terminal, or when the second information is "0", it may indicate that the transmit power of the terminal is not equal to the maximum available transmit power of the terminal.

It should be understood that when the network device communicates with the terminal in the carrier aggregation mode of the NR system, the transmit power of the terminal may be current actual transmit power of the terminal. In other words, the transmit power of the terminal may be actual power at which the terminal currently performs uplink transmission by using all component carriers. Alternatively, the transmit power of the terminal may be a sum of transmit power at which all the component carriers configured by the network device for the terminal currently perform uplink transmission.

When the network device communicates with the terminal in the dual-connectivity mode between the LTE system and the NR system, or when the network device communicates with the terminal in the dual-connectivity mode within the NR system, the plurality of component carriers configured by the network device for the terminal may be classified as a plurality of carrier groups (CG). In this case, the first component carrier and the second component carrier may belong to a same carrier group, and the transmit power of the terminal may be actual transmit power of the carrier group. In other words, the transmit power of the terminal may be actual power at which all component carriers in a carrier group to which the first component carrier and the second component carrier belong currently perform uplink transmission. Alternatively, the transmit power of the terminal may be a sum of transmit power at which all the component carriers in the carrier group to which the first component carrier and the second component carrier belong currently perform uplink transmission.

In this embodiment of this application, the carrier group may also be referred to as a cell group (CG).

It should be understood that when the network device communicates with the terminal in the carrier aggregation mode of the NR system, the maximum available transmit power of the terminal may be determined by a capability of the terminal. In a same uplink transmission time, actual transmit power of the terminal cannot exceed the maximum available transmit power of the terminal.

When the network device communicates with the terminal in the dual-connectivity mode between the LTE system and the NR system, or when the network device communicates with the terminal in the dual-connectivity mode within the NR system, namely, when the plurality of component carriers configured by the network device for the terminal may be classified as a plurality of carrier groups, the maximum available transmit power of the terminal may be maximum available transmit power of the carrier group to which the first component carrier and the second component carrier belong. In a same uplink transmission time, actual transmit power of all component carriers in the carrier group to which the first component carrier and the second component carrier belong cannot exceed the maximum available transmit power of the terminal.

The third information may also be understood as indicating an adjustable range of uplink power in a subsequent slot of the first component carrier.

The third information is specifically: the maximum available transmit power of the terminal—the transmit power of the second component carrier. The transmit power of the second component carrier is current actual uplink transmit power of the second component carrier.

S220. The network device schedules uplink transmission of the terminal based on the first information, the second information, and the third information, where uplink transmit power of the first component carrier does not exceed the difference between the maximum available transmit power of the terminal and the transmit power of the second component carrier.

After receiving the first information, the second information, and the third information that are sent by the terminal by using the first component carrier, the network device may schedule the uplink transmission of the terminal based on the three pieces of information, so that when the terminal performs uplink transmission, power of each component carrier can meet a requirement.

It should be noted that when the network device schedules the uplink transmission of the terminal, so that uplink power of each component carrier meets a requirement, the uplink transmit power of the first component carrier does not exceed the difference between the maximum available transmit power of the terminal and the transmit power of the second component carrier.

In this embodiment of this application, the network device schedules the uplink transmission of the terminal based on not only the power headroom of the first component carrier, but also whether the terminal has used the maximum available transmit power and an adjustable range of the uplink power of the second component carrier. In other words, the network device may schedule the uplink transmission of the terminal based on more parameters, thereby helping better control uplink power of each component carrier of the terminal.

In addition, because a slot of the first component carrier with a relatively large subcarrier spacing is relatively small, the terminal sends the first information, the second information, and the third information by using the first component carrier with the relatively large subcarrier spacing, so that the network device can learn of the first information, the second information, and the third information more timely, to schedule the terminal based on the first information, the second information, and the third information more timely.

Further, when the network device communicates with the terminal in the carrier aggregation mode of the NR system, the subcarrier spacing of the first component carrier may be a largest subcarrier spacing of a component carrier in the plurality of component carriers configured by the network device for the terminal. This helps further improve timeliness of the scheduling.

When the network device communicates with the terminal in the dual-connectivity mode between the LTE system and the NR system, or when the network device communicates with the terminal in the dual-connectivity mode within the NR system, the subcarrier spacing of the first component carrier may be a largest subcarrier spacing of a component carrier in a carrier group to which the first component carrier belongs. This helps further improve timeliness of the scheduling.

In S210, that the terminal sends the first information, the second information, and the third information by using the first component carrier may include: When determining that a trigger condition is met, the terminal sends the first information, the second information, and the third information by using the first component carrier. The trigger condition includes: The slot of the first component carrier has an overlapped part with a slot corresponding to the second component carrier.

In other words, after determining that a slot in which the terminal performs uplink transmission by using the first component carrier overlaps a slot in which the terminal performs uplink transmission by using the second component carrier, the terminal sends the first information, the second information, and the third information by using the first component carrier with the relatively large subcarrier spacing. The network device may schedule, based on the first information, the second information, and the third information, a next uplink slot in which the first component carrier overlaps the second component carrier.

Figure 3:
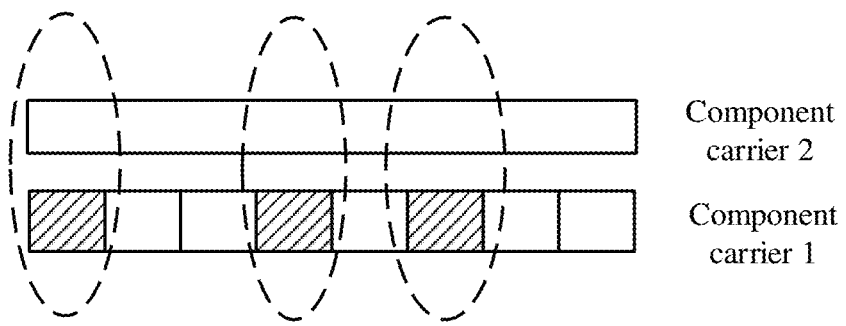
FIG. 3 is a schematic diagram of a component carrier according to an embodiment of this application.

As shown in FIG. 3, the subcarrier spacing of the first component carrier is 120 kHz, the subcarrier spacing of the second component carrier is 15 kHz, and a slot length of the second component carrier is eight times that of the first component carrier. One uplink slot of the second component carrier overlaps three uplink slots of the first component carrier.

When determining that the slot of the second component carrier overlaps a first slot of the first component carrier, the terminal sends the first information, the second information, and the third information in a first overlapped slot (namely, the first slot of the first component carrier) by using the first component carrier. After receiving the first information, the second information, and the third information, the network device performs uplink scheduling on a second overlapped slot of the first component carrier (namely, a fourth slot of the first component carrier) based on the first information, the second information, and the third information, so that uplink transmit power of a first component carrier obtained after the scheduling in the second overlapped slot does not exceed the difference indicated by the third information.

Likewise, when determining that the slot of the second component carrier overlaps the fourth slot of the first component carrier, the terminal sends the first information, the second information, and the third information in the second overlapped slot by using the first component carrier. After receiving the first information, the second information, and the third information, the network device performs uplink scheduling on a third overlapped slot of the first component carrier (namely, a sixth slot of the first component carrier) based on the first information, the second information, and the third information, so that uplink transmit power of a first component carrier obtained after the scheduling in the third overlapped slot does not exceed the difference indicated by the third information.

The terminal sends the first information, the second information, and the third information provided that the trigger condition is met, so that the network device can schedule the uplink transmission of the terminal based on the first information, the second information, and the third information provided that the terminal meets the trigger condition, thereby improving scheduling efficiency of the network device.

In S210, specifically, the terminal may send the first information, the second information, and the third information by using a media access control (MAC) control element (CE) or radio resource control (RRC) signaling.

In S220, that the network device schedules the uplink transmission of the terminal based on the first information, the second information, and the third information may include any one or more of the following scheduling behaviors.

A first scheduling behavior: When determining, based on the first information, that the power headroom of the first component carrier is greater than 0, and determining, based on the second information, that the transmit power of the terminal is equal to the maximum available transmit power of the terminal, the network device reduces, based on the third information, a frequency domain resource allocated to the terminal in a first slot on the first component carrier, where the first slot is after a second slot, and the second slot is a slot in which the terminal sends the first information by using the first component carrier.

In other words, when the power headroom of the first component carrier in a current overlapped slot (namely, the second slot) is greater than 0, and a current transmit power of the terminal is equal to the maximum available transmit power of the terminal, in addition to ensuring that uplink power of the first component carrier in a subsequent overlapped slot (namely, the first slot) does not exceed the difference indicated by the third information, the network device reduces a frequency domain resource allocated to the terminal on the first component carrier in the subsequent overlapped slot.

A second scheduling behavior: When determining, based on the first information, that the power headroom of the first component carrier is greater than 0, and determining, based on the second information, that the transmit power of the terminal is not equal to the maximum available transmit power of the terminal, the network device increases, based on the third information, a frequency domain resource allocated to the terminal in a first slot on the first component carrier, where the first slot is after a second slot, and the second slot is a slot in which the terminal sends the first information by using the first component carrier.

In other words, when the power headroom of the first component carrier in a current overlapped slot (namely, the second slot) is greater than 0, and a current transmit power of the terminal is not equal to the maximum available transmit power of the terminal, in addition to ensuring that uplink power of the first component carrier in a subsequent overlapped slot (namely, the first slot) does not exceed the difference indicated by the third information, the network device increases a frequency domain resource allocated to the terminal on the first component carrier in the subsequent overlapped slot.

A third scheduling behavior: When determining, based on the first information, that the power headroom of the first component carrier is less than 0, and determining, based on the second information, that the transmit power of the terminal is not equal to the maximum available transmit power of the terminal, the network device reduces, based on the third information, a frequency domain resource allocated to the terminal in a first slot on the first component carrier, where the first slot is after a second slot, and the second slot is a slot in which the terminal sends the first information by using the first component carrier.

In other words, when the power headroom of the first component carrier in a current overlapped slot (namely, the second slot) is less than 0, and a current transmit power of the terminal is not equal to the maximum available transmit power of the terminal, in addition to ensuring that uplink power of the first component carrier in a subsequent overlapped slot (namely, the first slot) does not exceed the difference indicated by the third information, the network device reduces a frequency domain resource allocated to the terminal on the first component carrier in the subsequent overlapped slot.

A fourth scheduling behavior: When determining, based on the first information, that the power headroom of the first component carrier is less than 0, and determining, based on the second information, that the transmit power of the terminal is equal to the maximum available transmit power of the terminal, the network device reduces, based on the third information, a frequency domain resource allocated to the terminal in a first slot on the first component carrier, where the first slot is after a second slot, and the second slot is a slot in which the terminal sends the first information by using the first component carrier.

In other words, when the power headroom of the first component carrier in a current overlapped slot (namely, the second slot) is less than 0, and a current transmit power of the terminal is equal to the maximum available transmit power of the terminal, in addition to ensuring that uplink power of the first component carrier in a subsequent overlapped slot (namely, the first slot) does not exceed the difference indicated by the third information, the network device reduces a frequency domain resource allocated to the terminal on the first component carrier in the subsequent overlapped slot.

It should be understood that the foregoing scheduling behaviors of the network device are merely examples, and the uplink scheduling behavior performed by the network device based on the first information, the second information, and the third information is not limited in this embodiment of this application.

Figure 4:
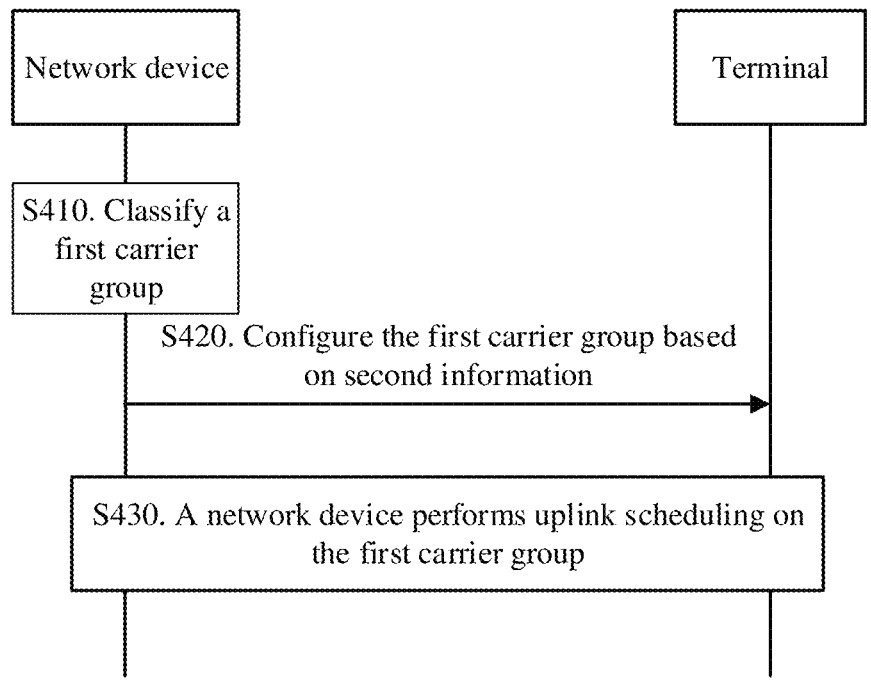
FIG. 4 is a schematic flowchart of a communication method according to another embodiment of this application.

A schematic flowchart of a communication method according to another embodiment of this application is shown in FIG. 4. It should be understood that FIG. 4 shows steps or operations of the communication method, but these steps or operations are merely examples. In this embodiment of this application, another operation or a variant of each operation in FIG. 4 may be performed. In addition, the steps in FIG. 4 may be performed in an order different from that presented in FIG. 4.

S410. A network device classifies, based on subcarrier spacings of a plurality of component carriers configured by the network device for a terminal, at least one component carrier in the plurality of component carriers as a first carrier group.

In this embodiment of this application, the network device may configure a plurality of component carriers for the terminal.

For example, when the network device communicates with the terminal in a dual-connectivity mode between an LTE system and an NR system, the network device may configure, for the terminal, a component with a subcarrier spacing of 15 kHz in the LTE system, and configure, for the terminal, a component carrier with a subcarrier spacing of $15*2^n$ kHz in the NR system, where n is an integer.

Figure 5:
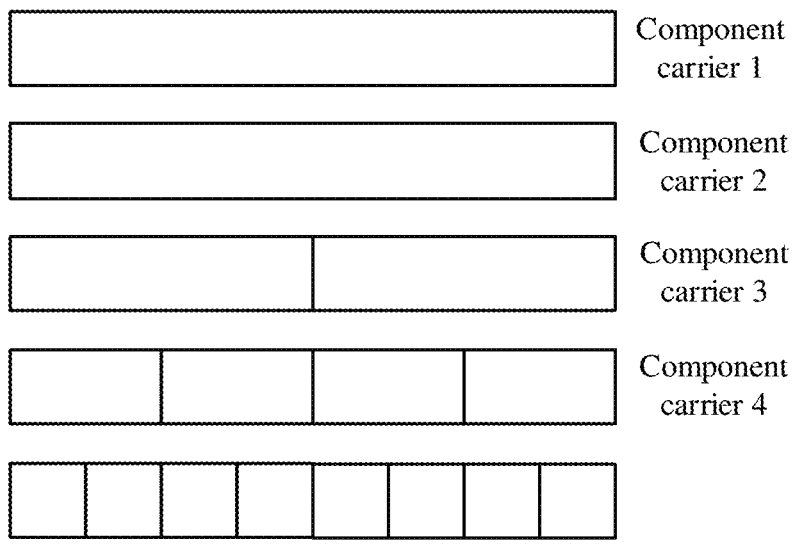
FIG. 5 is a schematic diagram of a component carrier according to another embodiment of this application.

An example in which the network device configures the plurality of component carriers for the terminal is shown in FIG. 5. In other words, the network device configures, for the terminal, the component carrier with a subcarrier spacing of 15 kHz in the LTE system, and configures, for the terminal, component carriers respectively with a subcarrier spacing of 15 kHz, 30 kHz, 60 kHz, and 120 kHz in the NR system.

After configuring the plurality of component carriers for the terminal, the network device may classify the plurality of component carriers as a plurality of carrier groups based on the subcarrier spacings of the plurality of component carriers.

The network device may classify component carriers with a same subcarrier spacing as a same carrier group. Alternatively, the network device may classify component carriers each with a subcarrier spacing of 15 kHz as a same carrier group, and classify all other component carriers as a same carrier group.

In this embodiment of this application, a carrier group with a subcarrier spacing of 15 kHz in the plurality of carrier groups obtained through classification may be referred to as the first carrier group. For example, when the network device configures component carriers shown in FIG. 5 for the terminal, the network device classifies two component carriers of 15 kHz as one carrier group, and the carrier group may be referred to as the first carrier group.

S420. The network device sends second information to the terminal, where the second information is used to configure the first carrier group. Correspondingly, the terminal receives the second information, and configures the first carrier group based on the second information.

In other words, the network device sends a classification result of carrier groups to the terminal, and the terminal configures the carrier groups based on the classification result.

Optionally, the second information may include information about all component carriers (for example, identifiers of all the component carriers) in the first carrier group, and information indicating that these component carriers belong to one carrier group.

For example, when the network device classifies a component carrier 1 and a component carrier 2 shown in FIG. 5 as the first carrier group, the second information may include an identifier of the component carrier 1 and an identifier of the component carrier 2, and information indicating that the component carrier 1 and the component carrier 2 belong to the first carrier group.

Optionally, before the network device sends the second information, the network device may send information about all component carriers configured for the terminal to the terminal. In this case, the second information may specifically include indexes that are of all component carriers in the first carrier group and that are in all component carriers configured by the network device for the terminal, and information indicating that these component carriers belong to one carrier group.

For example, the network device may send, to the terminal, identifiers of the component carrier 1 to the component carrier 5 shown in FIG. 5. When the network device classifies the component carrier 1 and the component carrier 2 as the first carrier group, the second information may include an index of the component carrier 1 (namely, an index 1) and an index of the component carrier 2 (namely, an index 2), and the component carrier 1 and the component carrier 2 are information about the first carrier group.

S430. The network device performs uplink scheduling on the first carrier group. In other words, the network device performs uplink scheduling on all carrier groups.

A behavior example in which the network device performs the uplink scheduling on the first carrier group is as follows.

For example, when the component carrier 1 and the component carrier 2 shown in FIG. 5 are classified as the first carrier group, all other component carriers are classified as a second carrier group or each of all the other component carriers is a group, and the LTE system and the NR system are in a synchronous dual-connectivity mode, the network device may schedule the terminal to perform power control on all carrier groups by using a power control mode 1 (PCM1) in the LTE, namely, schedule the terminal to perform power control on all carrier groups by using a method in which power scaling across carrier groups (across CGs) is performed based on a channel transmission priority, a signal transmission priority, or a service transmission priority carried in component carriers in all the carrier groups.

For example, when the component carrier 1 and the component carrier 2 shown in FIG. 5 are classified as the first carrier group, all other component carriers are classified as a second carrier group or each of all the other component carriers is a group, and the LTE system and the NR system are in an asynchronous dual-connectivity mode, the network device may schedule the terminal to use a power control mode 2 (PCM2) in the LTE. To be specific, one guaranteed power (guaranteed power) is semi-statically configured for each carrier group, and the terminal is scheduled to allocate remaining power to each carrier group based on a sequence priority of a transmission time.

For example, when the component carrier 1 and the component carrier 2 shown in FIG. 5 are classified as the first carrier group, all other component carriers are classified as the second carrier group or each of all the other component carriers is a group, and the LTE system and the NR system are in the asynchronous dual-connectivity mode, the terminal may be scheduled to perform power control on the component carrier 1 and the component carrier 2 in a look-ahead mode.

The network device may send the first information to the terminal, and the first information instructs the terminal to perform power control on the first carrier group in the look-ahead mode.

Specifically, the network device classifies, based on subcarrier spacings of the plurality of component carriers, a component carrier with a subcarrier spacing of a second subcarrier spacing in the plurality of component carriers as the second carrier group, where the second subcarrier spacing is greater than a first subcarrier spacing. The network device sends the first information to the terminal, and the first information instructs the terminal to perform power control on the first carrier group in the look-ahead mode.

The look-ahead mode is as follows. The terminal adjusts uplink power of the first carrier group based on uplink power of the second carrier group in a first slot and a channel priority, a signal priority, or a service priority of a component carrier in the first carrier group, where the first slot overlaps a second slot, an uplink timing of the first slot is after an uplink timing of the second slot, and the second slot is a slot in which the terminal performs uplink transmission by using the first carrier group.

The signal priority may be a priority of uplink control information (UCI).

Certainly, the terminal may further adjust the uplink power of the first carrier group based on a channel priority, a signal priority, or a service priority of a component carrier in the second carrier group.

It should be understood that, in the look-ahead mode, the terminal may perform inter-group power control on the first carrier group and the second carrier group, or may perform intra-group power control on the first carrier group.

Specifically, as shown in FIG. 6, the component carrier 1 is asynchronous to the component carrier 2, namely, an uplink timing of a slot of the component carrier 1 is not aligned with an uplink timing of a slot of the component carrier 2, and both a $j^{th}$ slot and a $(j+1)^{th}$ slot of the component carrier 2 overlap an $i^{th}$ slot of the component carrier 1. The component carrier 1 and the component carrier 2 may be component carriers in a same carrier group, or may be component carriers in different carrier groups. A subcarrier spacing of the component carrier 1 may be the same as or different from a subcarrier spacing of the component carrier 2.

In this case, the terminal may control the uplink power of the component carrier 1 in the $i^{th}$ slot based on the uplink power of the component carrier 2 in the $j^{th}$ slot. In addition, the terminal may further control the uplink power of the component carrier 1 in the $i^{th}$ slot based on a channel priority, a signal priority, or a service priority carried in the component carrier 2 in the $(j+1)^{th}$ slot and a channel priority, a signal priority, or a service priority carried in the component carrier 1 in the $i^{th}$ slot. More specifically, a PCM1 mode in the LTE may be used to control the uplink power of the component carrier 1 in the $i^{th}$ slot.

When the network device classifies component carriers other than a component carrier with a subcarrier spacing of 15 kHz in all component carriers as one carrier group, the network device may use the communication method shown in FIG. 2 to perform power control on the component carrier in the carrier group. For brevity, details are not described herein again.

FIG. 7 is a schematic flowchart of a communication method according to another embodiment of this application. It should be understood that FIG. 7 shows steps or operations of the communication method, but these steps or operations are merely examples. In this embodiment of this application, another operation or a variant of each operation in FIG. 7 may be performed. In addition, the steps in FIG. 7 may be performed in an order different from that presented in FIG. 7.

S710. A terminal determines an overlapped part between a first slot and a second slot, where the first slot is a slot in which the terminal uses a first component carrier, the second slot is a slot in which the terminal uses a second component carrier, the first component carrier carries a first channel, a first signal, or a first service, the second component carrier carries a second channel, a second signal, or a second service, and a priority of the second channel, the second signal, or the second service is higher than a priority of the first channel, the first signal, or the first service.

S720. The terminal adjusts uplink power of the first component carrier in the overlapped part between the first slot and the second slot.

As shown in FIG. 8, the network device configures a component carrier 1 and a component carrier 2 for the terminal, where a subcarrier spacing of the component carrier 1 is 15 kHz, and a subcarrier spacing of the component carrier 2 is 120 kHz. A channel, a signal, or a service carried on the component carrier 2 cannot reduce uplink transmit power. For example, the component carrier 2 carries a physical uplink control channel (PUCCH), a physical random access channel (PRACH), or an ultra-reliable and low latency communications (URLLC) service. In addition, total power of an overlapped part between a slot of the component carrier 1 and a slot of the component carrier 2 exceeds or is equal to maximum available transmit power of the terminal. If a channel, a signal, or a service carried on the component carrier 1 may reduce uplink transmit power, for example, an enhanced mobile broadband (eMBB) service, the terminal may adjust uplink power of the component carrier 1 in the overlapped part between the first slot and the second slot.

It should be understood that when the network device communicates with the terminal in a carrier aggregation mode of an NR system, the maximum available transmit power of the terminal may be determined by a capability of the terminal.

When the network device communicates with the terminal in a dual-connectivity mode between an LTE system and the NR system, or when the network device communicates with the terminal in a dual-connectivity mode within the NR system, namely, when a plurality of component carriers configured by the network device for the terminal may be classified as a plurality of carrier groups, the maximum available transmit power of the terminal may be maximum available transmit power of a carrier group on which power control is required to be performed.

Optionally, that the terminal adjusts the uplink power of the first component carrier in the overlapped part between the first slot and the second slot may include: The terminal sends uplink data in a slot other than the overlapped part in the first slot by using the first component carrier.

In other words, the terminal does not transmit a code block group (code block group, CBG) on the component carrier 1 in the overlapped part of the first slot, so that sufficient transmission power can be allocated to a channel, a signal, or a service on the component carrier 2 with a higher priority for transmission.

The foregoing untransmitted CBG may be retransmitted in another uplink slot.

Optionally, that the terminal adjusts the uplink power of the first component carrier in the overlapped part between the first slot and the second slot may include: The terminal reduces transmit power of a resource that is on the first component carrier and that carries service data in the overlapped part; or sends a signal only in a resource that is on the first component carrier and that carries a reference signal and/or control information.

In other words, the terminal may reduce uplink power of a data resource on the component carrier 1 in the overlapped part of the first slot. If required, service data on the component carrier 1 in the overlapped part of the first slot may not be transmitted, and uplink transmission of another channel or signal is reserved, for example, only a demodulation reference signal (DMRS) and/or uplink control information is transmitted.

This embodiment of this application further provides an apparatus embodiment that implements the steps and the methods in the foregoing method embodiments. The method, steps, technical details, and technical effects of the foregoing method embodiments are also applicable to the apparatus embodiments, and are not subsequently described in detail.

Figure 9:
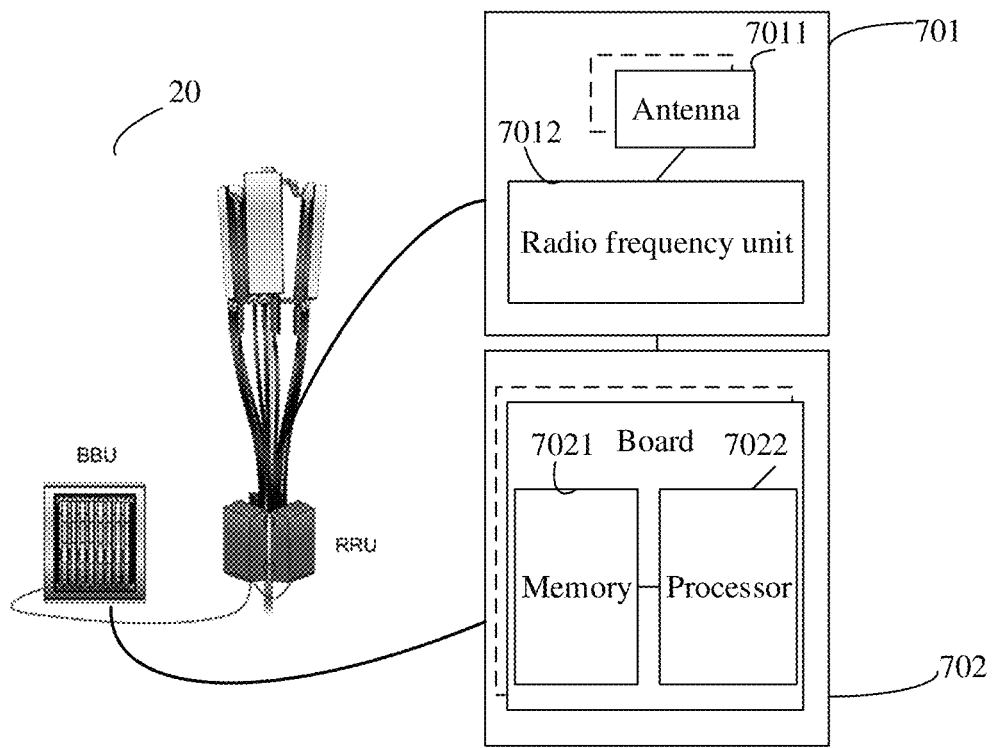
FIG. 9 is a schematic structural diagram of a network device according to an embodiment of this application.

FIG. 9 is a schematic structural diagram of a network device 20, and the network device may be applied to the system shown in FIG. 1. The network device 20 includes one or more remote radio units (RRU) 701 and one or more baseband units (BBU) 702. The RRU 701 may be referred to as a transceiver unit, a receiver/transmitter, a transceiver circuit, a transceiver, or the like, and may include at least one antenna 7011 and a radio frequency unit 7012. The RRU 701 is mainly configured to send and receive a radio frequency signal and convert a radio frequency signal and a baseband signal, for example, is configured to send a signaling indication or a reference signal in the foregoing embodiment to a terminal. The BBU 702 is mainly configured to: process a baseband, control a network device, and the like. The RRU 701 and the BBU 702 may be physically disposed together, or may be physically disposed separately, namely, a distributed base station.

The BBU 702 is a control center of the network device, may also be referred to as a processing unit, and is mainly configured to complete a baseband processing function, such as channel coding, multiplexing, modulation, and spectrum spreading. In an example, the BBU 702 may include one or more boards. A plurality of boards may jointly support a radio access network (for example, a 5G network) of a single access standard, or may separately support radio access networks of different access standards. The BBU 702 further includes a memory 7021 and a processor 7022. The memory 7021 is configured to store necessary instructions and data. The processor 7022 is configured to control the network device to perform a necessary action. The memory 7021 and the processor 7022 may serve one or more boards. In other words, a memory and a processor may be separately disposed on each board. Alternatively, a plurality of boards may share a same memory and a same processor. In addition, a necessary circuit is also set on each board.

The network device 20 shown in FIG. 9 may be configured to perform the steps performed by the network device in the communication method shown in FIG. 2. Specifically: a transceiver is configured to receive first information, second information, and third information that are sent by a terminal by using a first component carrier, where the first component carrier is one of a plurality of component carriers configured by the network device for the terminal, the first information includes a power headroom of the first component carrier, the second information indicates whether transmit power of the terminal is equal to a maximum available transmit power of the terminal, the third information indicates a difference between the maximum available transmit power and transmit power of a second component carrier, and a subcarrier spacing of the first component carrier is greater than a subcarrier spacing of the second component carrier. A processor is configured to schedule uplink transmission of the terminal based on the first information, the second information, and the third information, where uplink transmit power of the first component carrier does not exceed the difference.

Optionally, the subcarrier spacing of the first component carrier is greater than a subcarrier spacing of any other component carrier in the plurality of component carriers.

Optionally, the processor is specifically configured to: when determining, based on the first information, that the power headroom of the first component carrier is greater than 0, and determining, based on the second information, that the transmit power of the terminal is equal to the maximum available transmit power of the terminal, reduce, based on the third information, a frequency domain resource that is allocated to the terminal in a first slot on the first component carrier, where the first slot is after a second slot, and the second slot is a slot in which the terminal sends the first information by using the first component carrier; or when determining, based on the first information, that the power headroom of the first component carrier is greater than 0, and determining, based on the second information, that the transmit power of the terminal is not equal to the maximum available transmit power of the terminal, increase, based on the third information, a frequency domain resource that is allocated to the terminal in a first slot on the first component carrier, where the first slot is after a second slot, and the second slot is a slot in which the terminal sends the first information by using the first component carrier; or when determining, based on the first information, that the power headroom of the first component carrier is less than 0, and determining, based on the second information, that the transmit power of the terminal is not equal to the maximum available transmit power of the terminal, reduce, based on the third information, a frequency domain resource that is allocated to the terminal in a first slot on the first component carrier, where the first slot is after a second slot, and the second slot is a slot in which the terminal sends the first information by using the first component carrier; or when determining, based on the first information, that the power headroom of the first component carrier is less than 0, and determining, based on the second information, that the transmit power of the terminal is equal to the maximum available transmit power of the terminal, reduce, based on the third information, a frequency domain resource that is allocated to the terminal in a first slot on the first component carrier, where the first slot is after a second slot, and the second slot is a slot in which the terminal sends the first information by using the first component carrier.

The network device 20 shown in FIG. 9 may be configured to perform the steps performed by the network device in the communication method shown in FIG. 4. Specifically: a processor is configured to classify, based on subcarrier spacings of a plurality of component carriers configured between the network device and a terminal, a component carrier with a subcarrier spacing of a first subcarrier spacing in the plurality of component carriers as a first carrier group. The processor is further configured to perform uplink scheduling on the first carrier group.

Optionally, the processor is further configured to: classify, based on the subcarrier spacings of the plurality of component carriers, a component carrier with a subcarrier spacing of a second subcarrier spacing in the plurality of component carriers as a second carrier group; or classify, based on the subcarrier spacings of the plurality of component carriers, a component carrier that does not belong to the first carrier group and that is in the plurality of component carriers as a second carrier group.

Optionally, a transceiver is configured to send first information to the terminal, where the first information instructs the terminal to adjust uplink power of the first carrier group based on uplink power of the second carrier group in a first slot, the first slot overlaps a second slot, an uplink timing of the first slot is after an uplink timing of the second slot, and the second slot is a slot in which the terminal performs uplink transmission by using the first carrier group.

Optionally, the processor is further configured to configure guaranteed power for the first carrier group. The processor is specifically configured to perform the uplink scheduling on the first carrier group based on the guaranteed power.

Optionally, the transceiver is configured to send second information to the terminal, and the second information is used to configure the first carrier group.

Optionally, the second information may further be used to configure the second carrier group.

Figure 10:
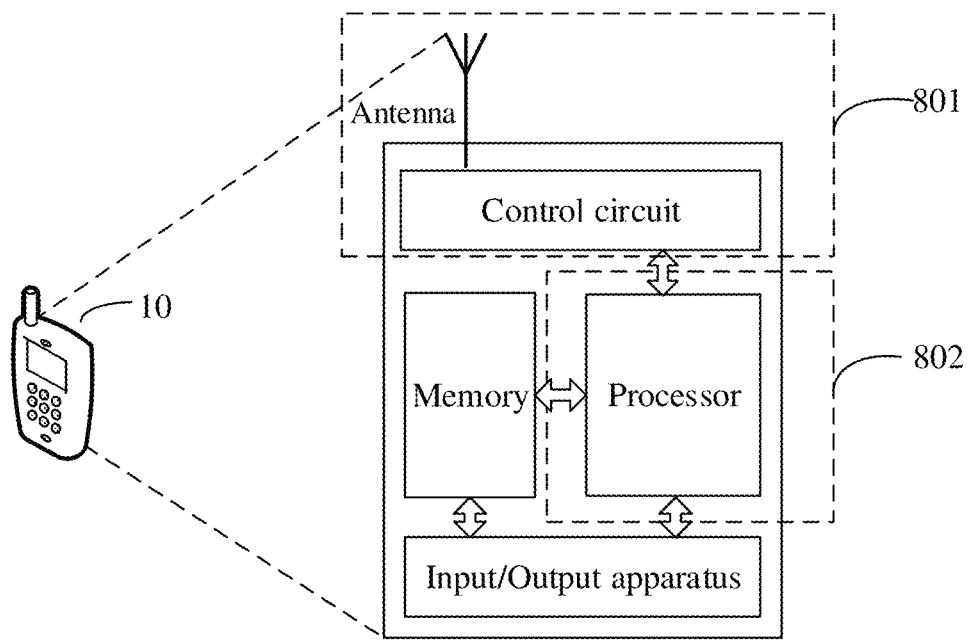
FIG. 10 is a schematic structural diagram of a terminal according to an embodiment of this application.

FIG. 10 is a schematic structural diagram of a terminal 10. The terminal may be applicable to a system shown in FIG. 1. For ease of description, FIG. 10 shows only main components of the terminal. As shown in FIG. 10, the terminal 10 includes a processor, a memory, a control circuit or an antenna, and an input/output apparatus. The processor is mainly configured to: process a communications protocol and communication data, control an entire terminal, execute a software program, and process data of the software program. The memory is mainly configured to store a software program and data, for example, store a codebook described in the foregoing embodiment. The control circuit is mainly used for conversion between a baseband signal and a radio frequency signal and processing of the radio frequency signal. The control circuit and the antenna may also be referred to as a transceiver, and are mainly configured to receive and transmit a radio frequency signal in a form of an electromagnetic wave. The input/output apparatus such as a touchscreen, a display screen, or a keyboard, is mainly configured to receive data entered by a user and output data to the user.

After the terminal is powered on, the processor may read a software program in a storage unit, interpret and execute an instruction of the software program, and process data of the software program. When data needs to be sent wirelessly, after performing baseband processing on to-be-sent data, the processor outputs a baseband signal to a radio frequency circuit. After performing radio frequency processing on the baseband signal, the radio frequency circuit sends the radio frequency signal in a form of an electromagnetic wave by using the antenna. When data is sent to the terminal, the radio frequency circuit receives the radio frequency signal by using the antenna, converts the radio frequency signal into a baseband signal, and outputs the baseband signal to the processor. The processor converts the baseband signal into data and processes the data.

A person skilled in the art may understand that, for ease of description, FIG. 10 shows only one memory and one processor. In an actual terminal, there may be a plurality of processors and memories. The memory may also be referred to as a storage medium, a storage device, or the like. This is not limited in this embodiment of this application.

In an optional implementation, the processor may include a baseband processor and a central processing unit. The baseband processor is mainly configured to process a communications protocol and communication data. The central processing unit is mainly configured to: control an entire terminal, execute a software program, and process data of the software program. The processor in FIG. 10 integrates functions of the baseband processor and the central processing unit. A person skilled in the art may understand that the baseband processor and the central processing unit may be independent processors, and are interconnected by using technologies such as a bus. A person skilled in the art may understand that the terminal may include a plurality of baseband processors to adapt to different network standards, the terminal may include a plurality of central processing units to enhance a processing capability of the terminal, and components of the terminal may be connected by using various buses. The baseband processor may alternatively be described as a baseband processing circuit or a baseband processing chip. The central processing unit may alternatively be described as a central processing circuit or a central processing chip. A function of processing the communications protocol and the communication data may be embedded in the processor, or may be stored in the storage unit in a form of a software program, and the processor executes the software program to implement a baseband processing function.

For example, in this embodiment of the present invention, an antenna and a control circuit that have a transceiver function may be considered as a transceiver unit 8oi of the terminal 10, and a processor that has a processing function is considered as a processing unit 802 of the terminal 10. As shown in FIG. 10, the terminal 10 includes the transceiver unit 801 and the processing unit 802. The transceiver unit may also be referred to as a transceiver, a receiver/transmitter, a transceiver apparatus, or the like. Optionally, a component configured to implement a receiving function in the transceiver unit 801 may be considered as a receiving unit, and a component configured to implement a sending function in the transceiver unit 801 is considered as a sending unit. In other words, the transceiver unit 801 includes the receiving unit and the sending unit. For example, the receiving unit may also be referred to as a receptor, a receiver, a receiving circuit, or the like, and the sending unit may be referred to as a transmitter, an emitter, a transmitting circuit, or the like.

The terminal 10 shown in FIG. 10 may be configured to perform the steps performed by the terminal in the communication method shown in FIG. 2. Specifically: a processor is configured to determine an overlapped part between a first slot and a second slot, where the first slot is a slot in which the terminal uses a first component carrier, the second slot is a slot in which the terminal uses a second component carrier, the first component carrier carries a first channel, a first signal, or a first service, the second component carrier carries a second channel, a second signal, or a second service, and a priority of the second channel, the second signal, or the second service is higher than a priority of the first channel, the first signal, or the first service. The processor is further configured to adjust uplink power of the first component carrier in the overlapped part.

Optionally, the processor is specifically configured to send uplink data by using the first component carrier in a part other than the overlapped part in the first slot.

Optionally, the processor is specifically configured to: reduce transmit power of a resource that is on the first component carrier and that carries service data in the overlapped part; or send a signal only in a resource that is on the first component carrier and that carries a reference signal and/or control information.

The terminal 10 shown in FIG. 10 may be configured to perform steps performed by the terminal in the communication method shown in FIG. 4. Specifically: a transceiver is configured to send first information, second information, and third information to a network device by using a first component carrier, where the first component carrier is one of a plurality of component carriers configured by the network device for the terminal, the first information includes a power headroom of the first component carrier, the second information indicates whether transmit power of the terminal is equal to maximum available transmit power of the terminal, the third information indicates a difference between the maximum available transmit power and transmit power of the second component carrier, and a subcarrier spacing of the first component carrier is greater than a subcarrier spacing of the second component carrier; and a processor is configured to perform uplink transmission under scheduling performed by the network device based on the first information, the second information, and the third information, where uplink transmit power of the first component carrier does not exceed the difference.

Optionally, the subcarrier spacing of the first component carrier is greater than a subcarrier spacing of any other component carrier in the plurality of component carriers.

The terminal 10 shown in FIG. 10 may be configured to perform steps performed by the terminal in the communication method shown in FIG. 7. Specifically: a transceiver is configured to receive first information sent by a network device, where the first information instructs the terminal to adjust uplink power of a first carrier group based on uplink power of a second carrier group in a first slot, the first slot overlaps a second slot, an uplink timing of the first slot is after an uplink timing of the second slot, the second slot is a slot in which the terminal performs uplink transmission by using the first carrier group, the first carrier group includes a component carrier with a subcarrier spacing of a first subcarrier spacing in a plurality of component carriers configured by the network device for the terminal, and the second carrier group includes a component carrier with a subcarrier spacing of a second subcarrier spacing in the plurality of component carriers or includes all component carriers that do not belong to the first carrier group and that are in the plurality of component carriers. A processor is configured to adjust, under the instruction of the first information, the uplink power of the first carrier group based on the uplink power of the second carrier group in the first slot and a channel priority, a signal priority, or a service priority of the component carrier in the first carrier group.

Optionally, the transceiver is further configured to receive second information sent by the network device, where the second information is used to configure the first carrier group and the second carrier group.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

What is claimed is:

1. A terminal, comprising:
   a processor; and
   a non-transitory computer-readable storage medium storing a program to be executed by the processor, the program including instructions for:
      sending first information, second information, and third information to a network device using a first component carrier, wherein the first component carrier is one of a plurality of component carriers configured by the network device for the terminal, the first information comprises a power headroom of the first component carrier, the second information indicates whether a transmit power of the terminal is equal to a maximum available transmit power of the terminal, the third information indicates a difference between the maximum available transmit power and a transmit power of a second component carrier of the plurality of component carriers, and a subcarrier spacing of the first component carrier is greater than a subcarrier spacing of the second component carrier; and
      performing uplink transmission under scheduling performed by the network device based on the first information, the second information, and the third information, wherein an uplink transmit power of the first component carrier does not exceed the difference between the maximum available transmit power and the transmit power of the second component carrier of the plurality of component carriers.

2. The terminal according to claim 1, wherein the subcarrier spacing of the first component carrier is greater than a subcarrier spacing of any other component carrier in the plurality of component carriers.

3. A network device, comprising:
   a transceiver, configured to receive first information, second information, and third information that are sent by a terminal using a first component carrier, wherein the first component carrier is one of a plurality of component carriers configured by the network device for the terminal, the first information comprises a power headroom of the first component carrier, the second information indicates whether a transmit power of the terminal is equal to a maximum available transmit power of the terminal, the third information indicates a difference between the maximum available transmit power and a transmit power of a second component carrier of the plurality of component carriers, and a subcarrier spacing of the first component carrier is greater than a subcarrier spacing of the second component carrier;
   a processor; and
   a computer-readable storage medium storing a program to be executed by the processor, the program including instructions for:
      scheduling uplink transmission of the terminal based on the first information, the second information, and the third information, wherein an uplink transmit power of the first component carrier does not exceed the difference between the maximum available transmit power and the transmit power of the second component carrier of the plurality of component carriers.

4. The network device according to claim 3, wherein the subcarrier spacing of the first component carrier is greater than a subcarrier spacing of any other component carrier in the plurality of component carriers.

5. The network device according to claim 3, wherein the program includes instructions for:
   determining, based on the first information, that the power headroom of the first component carrier is greater than 0;
   determining, based on the second information, that the transmit power of the terminal is equal to the maximum available transmit power of the terminal; and
   reducing, based on the third information, a frequency domain resource that is allocated to the terminal in a first slot on the first component carrier, wherein the first slot is after a second slot, and the second slot is a slot in which the terminal sends the first information using the first component carrier.

6. The network device according to claim 3, wherein the program includes instructions for:
   determining, based on the first information, that the power headroom of the first component carrier is greater than 0;
   determining, based on the second information, that the transmit power of the terminal is not equal to the maximum available transmit power of the terminal; and
   increasing, based on the third information, a frequency domain resource that is allocated to the terminal in a first slot on the first component carrier, wherein the first slot is after a second slot, and the second slot is a slot in which the terminal sends the first information using the first component carrier.

7. The network device according to claim 3, wherein the program includes instructions for:
   determining, based on the first information, that the power headroom of the first component carrier is less than 0;
   determining, based on the second information, that the transmit power of the terminal is not equal to the maximum available transmit power of the terminal; and
   reducing, based on the third information, a frequency domain resource that is allocated to the terminal in a first slot on the first component carrier, wherein the first slot is after a second slot, and the second slot is a slot in which the terminal sends the first information by using the first component carrier.

8. The network device according to claim 3, wherein the program includes instructions for:
   determining, based on the first information, that the power headroom of the first component carrier is less than 0;
   determining, based on the second information, that the transmit power of the terminal is equal to the maximum available transmit power of the terminal; and
   reducing, based on the third information, a frequency domain resource that is allocated to the terminal in a first slot on the first component carrier, wherein the first slot is after a second slot, and the second slot is a slot in which the terminal sends the first information using the first component carrier.

9. A method, comprising:
   receiving, by a network device, first information, second information, and third information that are sent by a terminal using a first component carrier, wherein the first component carrier is one of a plurality of component carriers configured by the network device for the terminal, the first information comprises a power headroom of the first component carrier, the second information indicates whether a transmit power of the terminal is equal to a maximum available transmit power of the terminal, the third information indicates a difference between the maximum available transmit power and a transmit power of a second component carrier of the plurality of component carriers, and a subcarrier spacing of the first component carrier is greater than a subcarrier spacing of the second component carrier; and scheduling, by the network device, uplink transmission of the terminal based on the first information, the second information, and the third information, wherein an uplink transmit power of the first component carrier does not exceed the difference between the maximum available transmit power and the transmit power of the second component carrier of the plurality of component carriers.

10. The method according to claim 9, wherein the subcarrier spacing of the first component carrier is greater than a subcarrier spacing of any other component carrier in the plurality of component carriers.

11. The method according to claim 9, further comprising:
determining, based on the first information, that the power headroom of the first component carrier is greater than 0;
determining, based on the second information, that the transmit power of the terminal is equal to the maximum available transmit power of the terminal; and
reducing, based on the third information, a frequency domain resource that is allocated to the terminal in a first slot on the first component carrier, wherein the first slot is after a second slot, and the second slot is a slot in which the terminal sends the first information using the first component carrier.

12. The method according to claim 9, further comprising:
determining, based on the first information, that the power headroom of the first component carrier is greater than 0;
determining, based on the second information, that the transmit power of the terminal is not equal to the maximum available transmit power of the terminal; and
increasing, based on the third information, a frequency domain resource that is allocated to the terminal in a first slot on the first component carrier, wherein the first slot is after a second slot, and the second slot is a slot in which the terminal sends the first information using the first component carrier.

13. The method according to claim 9, further comprising:
determining, based on the first information, that the power headroom of the first component carrier is less than 0;
determining, based on the second information, that the transmit power of the terminal is not equal to the maximum available transmit power of the terminal; and
reducing, based on the third information, a frequency domain resource that is allocated to the terminal in a first slot on the first component carrier, wherein the first slot is after a second slot, and the second slot is a slot in which the terminal sends the first information by using the first component carrier.

14. The method according to claim 9, further comprising:
determining, based on the first information, that the power headroom of the first component carrier is less than 0;
determining, based on the second information, that the transmit power of the terminal is equal to the maximum available transmit power of the terminal; and
reducing, based on the third information, a frequency domain resource that is allocated to the terminal in a first slot on the first component carrier, wherein the first slot is after a second slot, and the second slot is a slot in which the terminal sends the first information using the first component carrier.

\* \* \* \* \*